(12) United States Patent
Banerjee et al.

(10) Patent No.: US 8,181,236 B2
(45) Date of Patent: May 15, 2012

(54) METHOD FOR AND APPARATUS FOR RETRIEVING USERNAME AND PASSWORD IN AN AUTHENTICATION PROTOCOL

(75) Inventors: Dwip N. Banerjee, Austin, TX (US); Manish Katiyar, Uttar Pradesh (IN); Sandeep R. Patil, Maharashtra (IN); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 961 days.

(21) Appl. No.: 12/170,815

(22) Filed: Jul. 10, 2008

(65) Prior Publication Data
US 2010/0011413 A1    Jan. 14, 2010

(51) Int. Cl.
*G06F 7/04* (2006.01)
(52) U.S. Cl. .................. 726/10; 726/2; 726/6
(58) Field of Classification Search ............ 726/10, 726/5, 6, 2; 713/168
See application file for complete search history.

(56) References Cited

U.S. PATENT DOCUMENTS

| | | | |
|---|---|---|---|
| 6,606,663 B1 | 8/2003 | Liao et al. | |
| 6,754,696 B1 * | 6/2004 | Kamath et al. | 709/213 |
| 6,938,057 B2 * | 8/2005 | Gusler et al. | 707/613 |
| 6,952,781 B1 * | 10/2005 | Chang et al. | 726/4 |
| 7,181,762 B2 | 2/2007 | Jerdonek | |
| 7,194,761 B1 | 3/2007 | Champagne | |
| 7,314,169 B1 * | 1/2008 | Jasper et al. | 235/382 |
| 7,542,999 B2 * | 6/2009 | Kamath et al. | 1/1 |
| 2002/0156965 A1 * | 10/2002 | Gusler et al. | 711/100 |
| 2005/0060316 A1 * | 3/2005 | Kamath et al. | 707/9 |
| 2008/0244712 A1 * | 10/2008 | Kitada et al. | 726/5 |
| 2009/0007250 A1 * | 1/2009 | Pouzin et al. | 726/10 |

OTHER PUBLICATIONS

Dovecot; Authentication/kerberos; http://web.archive.org/web/20071006163910/http://wiki.dovecot.org/Authentication/Kerberos; Sep. 2007.

* cited by examiner

*Primary Examiner* — Samson Lemma
(74) *Attorney, Agent, or Firm* — Robert C. Rolnik; David A. Mims

(57) ABSTRACT

Disclosed is a computer implemented method and apparatus to retrieve authentication records required for user validation and creation of authentication credentials from an authentication server to be passed to the user. The method is comprised of the authentication server storing a first authentication record, then generating a first authentication credential based on the first authentication record. The authentication server associates the first authentication record with a first credential expiration time. The authentication server stores a second authentication record. The authentication server generates a second authentication credential based on the second authentication record, wherein the second authentication credential is associated with a second credential expiration time. Next, the authentication server associates the second authentication credential with a second credential expiration time. The authentication server determines that the first credential expiration time is earlier than the second credential expiration time and caches the first authentication record to cache.

9 Claims, 4 Drawing Sheets

METHOD FOR AND APPARATUS FOR RETRIEVING USERNAME AND PASSWORD IN AN AUTHENTICATION PROTOCOL

BACKGROUND OF THE INVENTION

1. Field of the Invention

The present invention relates generally to a computer implemented method, data processing system, and computer program product for caching data. More specifically, the present invention relates to using a credential expiration time to sort an authentication credential among a group of authentication credentials for placement into a cache or non-volatile storage.

2. Description of the Related Art

Authentication is used to verify a user when communications pass through media that is uncontrolled by a user or a server. Authentication is a critical feature of organizations that must coordinate the operations of distant people, but require communication through potentially hostile territory and/or media. In recent times, authentication is used principally in banking, commerce, and personal matters, particularly over the Internet and other networks that do not natively support secure communications.

With the creation of websites that offer services to many people, it has become popular to delegate or otherwise subcontract the authentication function to central servers that can support many networked services, commonly called authentication servers. Accordingly, modem authentication servers may be required to authenticate or re-authenticate users in a scalable manner. One form of an authentication server is a server based on the Kerberos authentication protocol. An authentication server in the Kerberos authentication scheme is called a Kerberos server. The Kerberos authentication protocol is further described in Internet Engineering Task Force Request For Comments (RFC) 1510 and predecessor documents, which are hereby incorporated by reference. A user who wants to begin an authenticated session must first obtain an authentication credential from the authentication server. Accordingly, the user, through the operation of a client, issues a request for authentication with an authentication server. The Kerberos server issues an authentication credential to a user when the user, or the client used by the server, is verified as authentic.

An authentication credential is a record associated with a user name that includes a credential expiration time. The credential expiration time may be a time expressed as universal coordinated time. The credential expiration time may be a time offset from a universally accepted starting time, including, for example, an epoch, a religious event, a celestial event, or any other time treated as a start time by convention.

When the authentication credential is older than the time indicated by the credential expiration time, the authentication credential is expired. A user may renew the authentication credential by making a follow-up request to the authentication query. The expiration of an authentication credential may be set based on policies of the authentication server. Thus, one user may receive authentication credentials having credential expiration time set to expire a duration after the initial request. However, a second user may receive authentication credentials set to expire a shorter duration after the initial request as compared to the first user.

To boost performance, conventional authentication servers may cache authentication records. In such an authentication server, the processor does not cache authentication data depending upon the activeness or expiration of credentials. The data processing system simply caches the most recently accessed data, irrespective of expiration of a credential expiration time. The authentication systems such as Kerberos authentication servers allows each user to be assigned different credential expiration durations, in effect, allowing for customizing credential expiration depending on the user.

The authentication servers described above attempt to reduce cache misses by applying a least recently used principle to the cache. Accordingly, fewer cache misses occur in such authentication servers, as compared to authentication servers that do not use the LRU principle. Nevertheless, as the workload is increased in an authentication server, the number of authentication records that correspond to unexpired authentication credentials may be so large that the authentication records may not fit within the allocated cache.

When a cache miss occurs, the authentication server relies on non-volatile storage of the authentication server. A cache miss is a performance reduction that occurs when data predicted to be in cache, is actually stored in a block device. The block device typically retrieves data at rates that are orders of magnitude slower than accessing data in cache. Accordingly, such cache misses are to be avoided. The prior art authentication stored authentication credentials to non-volatile storage on the basis of the duration of the authentication credential, as expressed as the time between the beginning of a validity period and the credential expiration time. In practice, this configuration may be sub-optimal.

"Storing" is a generic term that describes placing data into a device that may maintain the data persistently, even absent power, as well as placing data into a device that is volatile, and thus requires power to store charge and other physical indicia of the data. "Caching" refers more specifically to the execution of moving and/or copying data to volatile storage, or storage that does not maintain the data absent periodic application of power. Volatile storage may include, for example, dynamic RAM, static RAM, among other forms of volatile storage. Static RAM is considered volatile storage in spite of studies that show that data may remain persistently stored as long as 13,100 milliseconds after the removal of power from the device. The residual period that data is reliably stored to volatile storage, for example, memory is called remanence.

SUMMARY OF THE INVENTION

The present invention provides a computer implemented method and apparatus to retrieve authentication records required for user validation and creation of authentication credentials from an authentication sever to be passed to the user. The method is comprised of the authentication server storing a first authentication record, then generating a first authentication credential based on the first authentication record. The authentication server associates the first authentication record with a first credential expiration time. The authentication server stores a second authentication record. The authentication server generates a second authentication credential based on the second authentication record, wherein the second authentication credential is associated with a second credential expiration time. Next, the authentication server associates the second authentication credential with a second credential expiration time. The authentication server determines that the first credential expiration time is earlier than the second credential expiration time and caches the first authentication record to cache.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
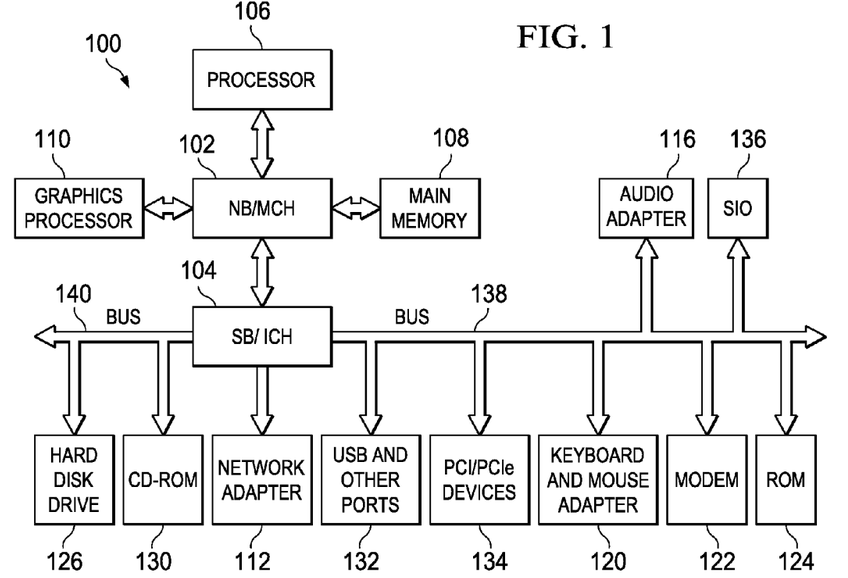
FIG. 1 is a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (B/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The aspects of the illustrative embodiments provide a computer implemented method, data processing system, and computer program product for enhancing the use of cache with respect to an authentication server. An authentication server may reduce retrieval time of authentication record used for creating the authentication credentials, as compared to the prior art, by more durably caching user authentication record such that those authentication records whose authentication credentials having an expiration time sooner in time are cached at the expense of authentication record whose authentication credentials set to expire later in time.

Figure 2A:
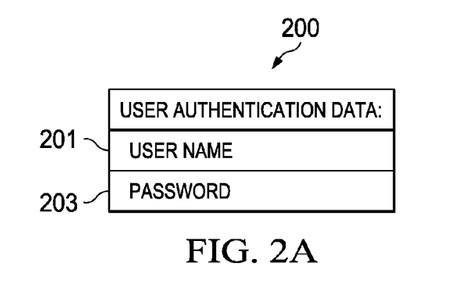
FIG. 2A is user authentication data in accordance with an illustrative embodiment of the invention.

FIG. 2A is user authentication data in accordance with an illustrative embodiment of the invention. User authentication data is a user name and a password. The user name and password may be stored at an authentication server or otherwise verifiable at an authentication server. In other words, the password may be encrypted when stored at the authentication server. The meaning of "password" includes an encrypted form of the password. Thus, user authentication data 200 may include, for example, user name 201 and password 203.

Figures 2B, 2C:
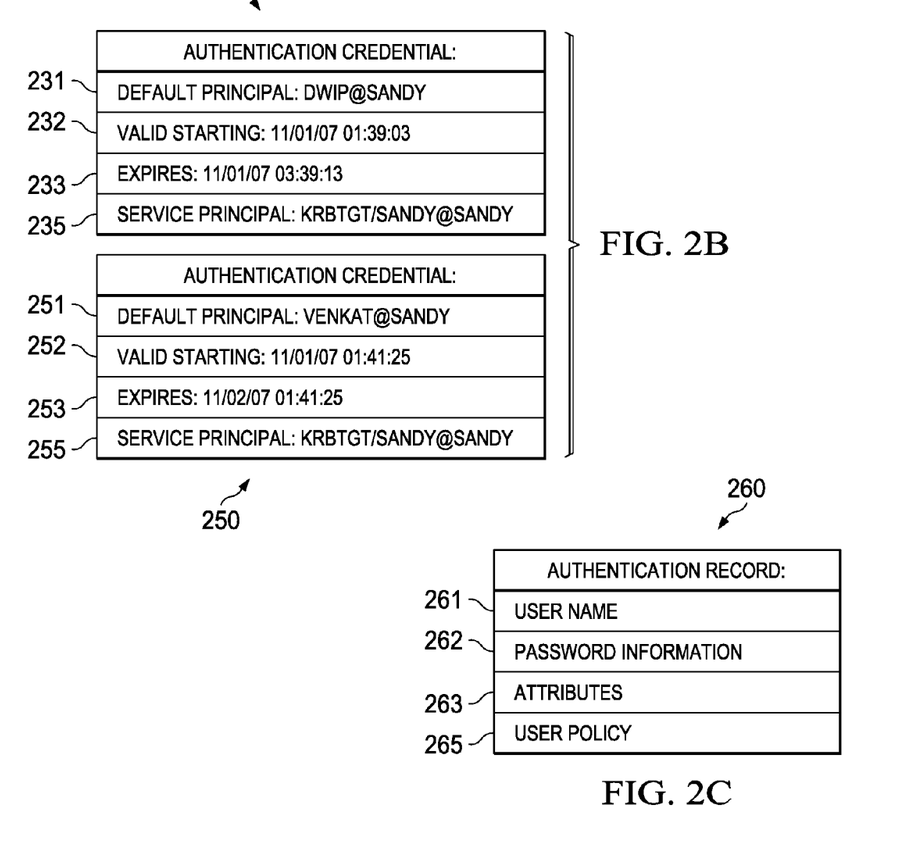
FIG. 2B is an authentication credential in accordance with an illustrative embodiment of the invention.
FIG. 2C is an authentication record in accordance with an illustrative embodiment of the invention.

FIG. 2B is an authentication credential in accordance with an illustrative embodiment of the invention. Authentication credential 230 is a credential corresponding to Dwip. Authentication credential 250 is an authentication credential corresponding to Venkat. Authentication credential 230 includes, default principal 231, validity start 232, credential expiration time 233, and service principal 235. The service principal indicates the kerberized service name that is accessible through the use of the authentication credential. Authentication credential 250 includes default principal 251, validity start 252, credential expiration time 253, and service principal 255. It is appreciated that authentication credential may take the form of fixed field width data structures, XML files, comma separated files, among other forms.

FIG. 2C is an authentication record in accordance with an illustrative embodiment of the invention. The authentication server makes use of the user provided authentication data, explained in FIG. 2A above, and compares the authentication data with the authentication record of the user stored at the server location. If the authentication data provided by the user matches the authentication record, the user is successfully authenticated. Next, the server creates an authentication credentials for the user. The authentication server may limit access to the authentication records of all the users such that no authentication record exists outside the authentication server. The authentication record 260 includes, for example, username 261, password information 262, attributes 263, and user policy 265. The username is an arbitrary string to identify a user and a user's allowed features and authority in one or more data processing systems. The user name is sometimes called a user account. Password information is either a password, or an encrypted form of a password. User policy describes a policy associated with the user. The policy can be a duration that authentication credentials remain valid after the authentication credentials are created. Thus, an authentication record is a record that includes at least a user name and password information stored as either plain text or in encrypted form.

Figure 2D:
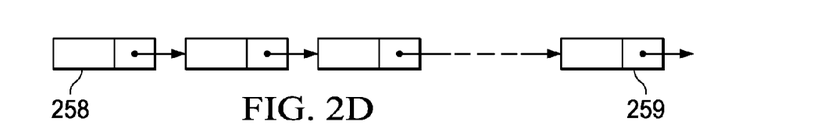
FIG. 2D is a data structure for storing and sorting pairs of authentication records and credential expiration times in accordance with an illustrative embodiment of the invention.

FIG. 2D is a data structure for storing and sorting pairs of authentication records and credential expiration times in accordance with an illustrative embodiment of the invention. The data structure may be a linked list. The linked list may reference authentication records that are in a cache. The linked list may arrange the authentication records in the order of increasing credential expiration times. Accordingly, the linked list may be expiration-indexed. Thus, head of the list 258, may have the authentication record having an earliest or lowest credential expiration time, while the tail of the list 259, may have may have the authentication record associated with credential expiration time that is highest among those authentication records in the linked list.

Figure 3:
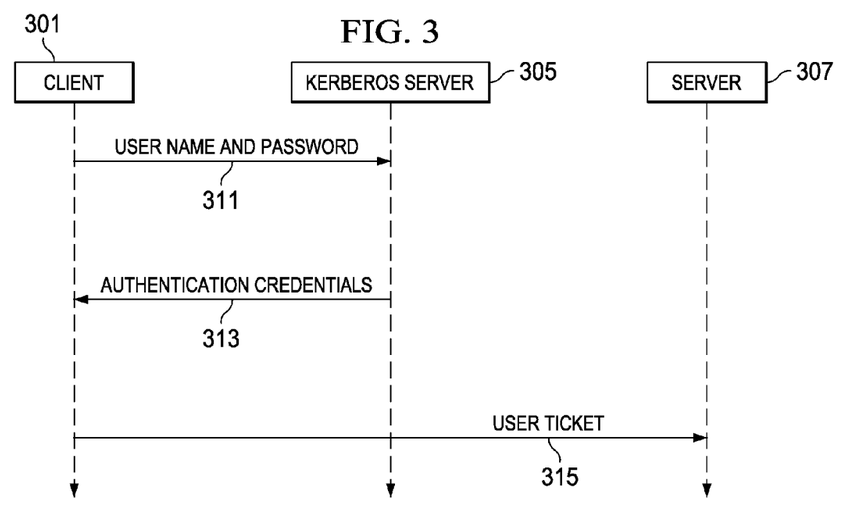
FIG. 3 is a communication diagram in accordance with an illustrative embodiment of the invention.

FIG. 3 is a communication diagram in accordance with an illustrative embodiment of the invention. A client is a device that requests authentication with respect to a server. A client may be, for example, an instance of data processing system 100 of FIG. 1. Initially, a user may use client 301 to transmit a user name and password to a server, for example, Kerberos server 305. The user name and password 311, in whatever form, make up authentication data. Kerberos server 305 responds by transmitting authentication credentials 313. Authentication credentials may be, for example, a Kerberos ticket. Next, client 301 may send a user ticket 315 to server 307. Server 307 may host a Kerberized application. Accordingly, the Kerberized application may respond by providing a user access to data controlled by the Kerberized application. Kerberos server 305 may be, for example, an instance of data processing system 100 of FIG. 1. Accordingly, Kerberos server 305 may use disk drive 126 as storage. Storage is a device that holds data regardless of the routine application of power to maintain the integrity of the data. Storage includes, for example, block access devices, disk drives, optical drives, flash memory, random access memory, among others. Similarly, Kerberos server 305 may use main memory 108 as cache. A cache is a storage that requires power to be accessible. In contrast, non-volatile storage is storage that does not require power in order to retrieve reliably the data after the remanence period.

Figure 4A:
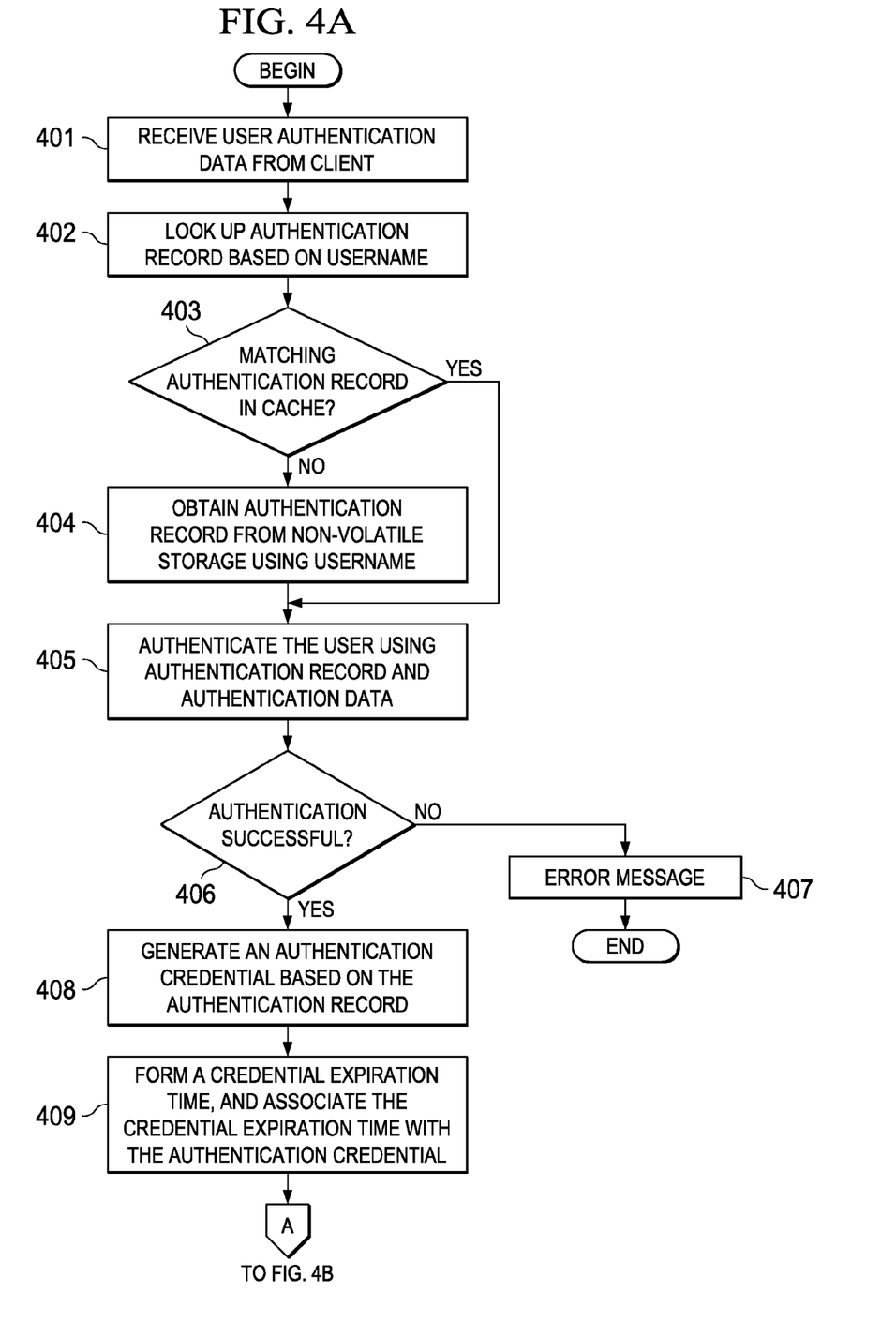
FIGS. 4A and 4B is a flowchart for looking up and authenticating a client in accordance with an illustrative embodiment of the invention.
Figure 4B:
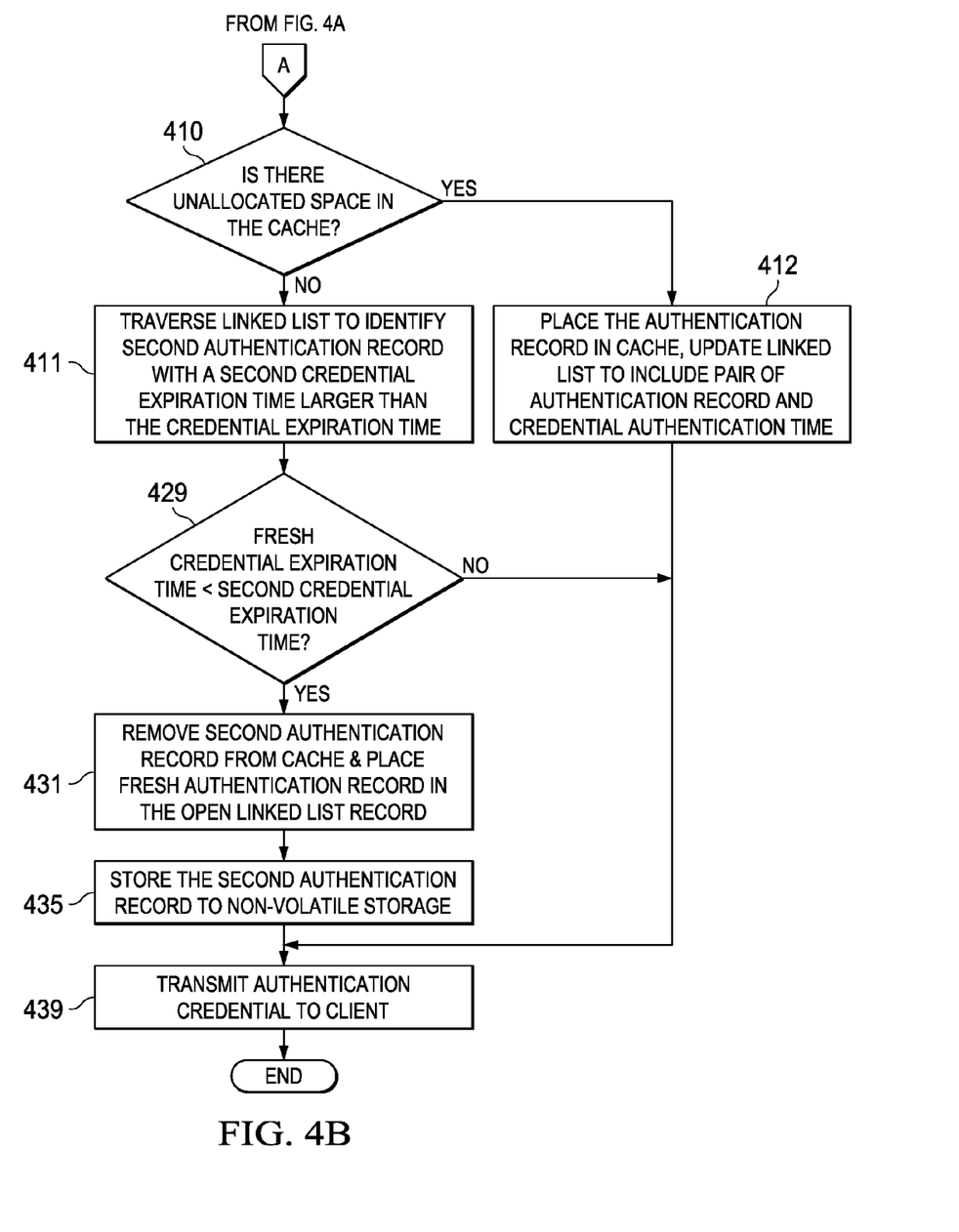

FIGS. 4A and 4B is a flowchart for looking up and authenticating a client in accordance with an illustrative embodiment of the invention. Initially, an authentication server receives a user authentication data from a client (step 401). Next, the authentication server may look up an authentication record based on a user name (step 402). The authentication server may determine whether there is a matching authentication record in the cache (step 403). The authentication record may be in the form shown as authentication record 260 of FIG. 2C. A negative determination may cause the authentication server to obtain an authentication record from non-volatile storage using the user name (step 404). The process continues to step 405 thereafter.

It is appreciated that the flowchart of FIGS. 4A and 4B may process many authentication records. Each authentication record or request for user authentication may involve the authentication server to process a different authentication records.

A positive determination at step 403 may cause the authentication server to authenticate the user using the authentication record and the authentication data (step 405). The authentication server may retrieve the first authentication record in step 405. Next, the authentication server may determine if the authentication was successful (step 406). If the authentication of the client was not successful, then the authentication server may issue an error message 407 to the client (step 407). Processing may terminate thereafter.

However, a correctly authenticated client may cause the authentication server to generate an authentication credential based on the authentication record (step 408). Next, the authentication server may form a credential expiration time, and associate the credential expiration time with the authentication credential (step 409). Next, the authentication server may determine if there is unallocated space in the cache (step 410). If there is unallocated space, then the authentication server may place the authentication record in cache, and update a linked list to include a pair of authentication record and credential authentication time (step 412). Next, the authentication server may transmit authentication credential to the client (step 439). Processing may terminate thereafter.

However, if there is no space in the cache at step 410, the authentication server may traverse a linked list (see FIG. 2D) to identify a second authentication record with a second credential expiration time larger than the credential expiration time (step 411). The 'credential expiration time' is from step 408, and is a fresh credential expiration time. 'Fresh' is a relative term that compares the creation times of two credential expiration times. Thus, a credential expiration time is a fresh credential expiration time relative to a second credential expiration time if the second credential expiration time was created after the fresh credential expiration time.

Next, the authentication server determines if the fresh credential expiration time is earlier than the second credential expiration time (step 429). If the fresh credential expiration time is not earlier than the second credential expiration time, the authentication server performs step 439. Otherwise, the authentication server removes the second authentication record from cache and places the fresh authentication record in an open linked list record (step 431). Following step 431, the authentication server stores the second authentication record to storage (step 435). Removing the second authentication record from cache is the equivalent of not caching the second authentication record to cache. The authentication server next performs step 439.

The illustrative embodiments permit an authentication server to respond in a rapid fashion in an environment where user authentication credentials having a near-future authentication expiration time is high frequency, as compared to access to user authentication credentials having a far-future authentication expiration time. Consequently, such an authentication server may reduce wear on volatile storage associated with access to such storage.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for retrieving an authentication record, the computer implemented method comprising:
    a computer storing a first authentication record;
    the computer generating a first authentication credential based on the first authentication record, wherein the first authentication credential is associated with a first credential expiration time;
    the computer associating the first authentication record with the first credential expiration time;
    the computer storing a second authentication record;
    the computer generating a second authentication credential based on the second authentication record, wherein the second authentication credential is associated with a second credential expiration time;
    the computer associating the second authentication record with the second credential expiration time;
    the computer determining that the first credential expiration time is earlier than the second credential expiration time; and
    the computer, responsive to a determination that the first credential expiration time is earlier than the second credential expiration time, caching the first authentication record to cache;
    the computer, responsive to the determination that the first credential expiration time is earlier than the second credential expiration time, determining that the cache is full; and
    the computer, responsive to the determination that the first credential expiration time is earlier than the second credential expiration time and responsive to the determination that the cache is full, storing the second authentication record to storage without caching the second authentication record to cache.

2. The computer implemented method of claim 1, wherein the cache comprises an ordered list of at least two authentication records arranged in order of credential expiration times associated with each authentication credential.

3. The computer implemented method of claim 1, wherein the cache comprises a tree of at least two authentication records arranged in order of credential expiration times associated with each authentication credential.

4. A computer program product for retrieving authentication record, the computer program product comprising: a computer-readable tangible storage device having computer usable program code embodied therewith, the computer program product comprising:
    computer usable program code configured to store a first authentication record;
    computer usable program code configured to generate a first authentication credential based on the first authentication record, wherein the first authentication credential is associated with a first credential expiration time;
    computer usable program code configured to associate the first authentication record with the first credential expiration time;
    computer usable program code configured to store a second authentication record;
    computer usable program code configured to generate a second authentication credential based on the second authentication record, wherein the second authentication credential is associated with a second credential expiration time;
    computer usable program code configured to associate the second authentication record with the second credential expiration time;

computer usable program code configured to determine that the first credential expiration time is earlier than the second credential expiration time;

computer usable program code configured to cache the first authentication record responsive to a determination that the first credential expiration time is earlier than the second credential expiration time;

computer usable program code configured to determine that the cache is full, responsive to the determination that the first credential expiration time is earlier than the second credential expiration time; and computer usable program code configured to store the second authentication record to storage without caching the second authentication record to cache responsive to the determination that the first credential expiration time is earlier than the second credential expiration time and responsive to the determination that the cache is full.

5. The computer program product of claim 4, wherein the cache comprises an ordered list of at least two authentication records arranged in order of credential expiration times associated with each authentication credential.

6. The computer program product of claim 4, wherein the cache comprises a tree of at least two authentication records arranged in order of credential expiration times associated with each authentication credential.

7. A data processing system comprising:

a bus;

a storage device connected to the bus, wherein computer usable code is located in the storage device;

a communication unit connected to the bus; and a processing unit connected to the bus, wherein the processing unit executes the computer usable code for retrieving an authentication record, wherein the processing unit executes the computer usable program code to store a first authentication record; generate a first authentication credential based on the first authentication record, wherein the first authentication credential is associated with a first credential expiration time; associate the first authentication record with the first credential expiration time; store a second authentication record; generate a second authentication credential based on the second authentication record, wherein the second authentication credential is associated with a second credential expiration time; associate the second authentication record with the second credential expiration time; determine that the first credential expiration time is earlier than the second credential expiration time; cache the first authentication record responsive to a determination that the first credential expiration time is earlier than the second credential expiration time; determine that the cache is full, responsive to the determination that the first credential expiration time is earlier than the second credential expiration time; and store the second authentication record to storage without caching the second authentication record to cache responsive to the determination that the first credential expiration time is earlier than the second credential expiration time and responsive to the determination that the cache is full.

8. The data processing system of claim 7, wherein the cache comprises an ordered list of at least two authentication records arranged in order of credential expiration times associated with each authentication credential.

9. The data processing system of claim 7, wherein the cache comprises a tree of at least two authentication records arranged in order of credential expiration times associated with each authentication credential.

\* \* \* \* \*